United States Patent
Dahlquist

(10) Patent No.: US 12,395,618 B2
(45) Date of Patent: Aug. 19, 2025

(54) REAL-TIME MULTIVIEW VIDEO CONVERSION METHOD AND SYSTEM

(71) Applicant: LEIA INC., Menlo Park, CA (US)

(72) Inventor: Nicolas Dahlquist, Redwood City, CA (US)

(73) Assignee: LEIA SPV LLC, Menlo Park, CA (US)

( * ) Notice: Subject to any disclaimer, the term of this patent is extended or adjusted under 35 U.S.C. 154(b) by 171 days.

(21) Appl. No.: 18/205,527

(22) Filed: Jun. 3, 2023

(65) Prior Publication Data

US 2023/0328222 A1    Oct. 12, 2023

Related U.S. Application Data

(63) Continuation of application No. PCT/US2021/020166, filed on Feb. 28, 2021.

(60) Provisional application No. 63/122,419, filed on Dec. 7, 2020.

(51) Int. Cl.
*H04N 13/351* (2018.01)
*G06T 1/20* (2006.01)
*G06T 5/50* (2006.01)

(52) U.S. Cl.
CPC ............ *H04N 13/351* (2018.05); *G06T 1/20* (2013.01); *G06T 5/50* (2013.01); *G06T 2207/20221* (2013.01)

(58) Field of Classification Search
CPC .............. H04N 13/351; H04N 13/111; H04N 21/8547; H04N 13/261
See application file for complete search history.

(56) References Cited

U.S. PATENT DOCUMENTS

| | | |
|---|---|---|
| 9,128,226 B2 | 9/2015 | Fattal et al. |
| 9,201,270 B2 | 12/2015 | Fattal et al. |
| 9,298,168 B2 | 3/2016 | Taff et al. |

(Continued)

FOREIGN PATENT DOCUMENTS

| | | |
|---|---|---|
| CA | 3201940 | 6/2022 |
| CN | 116601943 | 8/2023 |

(Continued)

OTHER PUBLICATIONS

"International Application Serial No. PCT US2021 020166, International Preliminary Report on Patentability mailed Jun. 22, 2023", 7 pgs.

(Continued)

*Primary Examiner* — Ryan M Gray
(74) *Attorney, Agent, or Firm* — Schwegman, Lundberg & Woessner, P.A.

(57) ABSTRACT

Systems and methods are directed to real-time multiview video conversion. This conversion may involve receiving a video stream including two-dimensional (2D) frames, where each 2D frame corresponds to a respective 2D video timestamp. In addition, a camera baseline and a center viewpoint are identified. These parameters may be user-specified or predetermined. A target timestamp for a view of a multiview frame may be determined based on the camera baseline and the center viewpoint. The view is generated from a subset of 2D frames having 2D video timestamps adjacent to the target timestamp. A multiview video is rendered for display, where the multiview video comprises the view of the multiview frame.

20 Claims, 10 Drawing Sheets

(56) References Cited

U.S. PATENT DOCUMENTS

| | | |
|---|---|---|
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 9,967,537 B2 | 5/2018 | Bruls et al. |
| 10,345,505 B2 | 7/2019 | Fattal |
| 10,551,546 B2 | 2/2020 | Fattal |
| 10,649,128 B2 | 5/2020 | Fattal et al. |
| 10,705,281 B2 | 7/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,884,175 B2 | 1/2021 | Fattal |
| 10,928,564 B2 | 2/2021 | Fattal |
| 10,928,677 B2 | 2/2021 | Aieta et al. |
| 10,969,627 B2 | 4/2021 | Fattal et al. |
| 11,004,407 B2 | 5/2021 | Fattal et al. |
| 11,016,235 B2 | 5/2021 | Fattal et al. |
| 11,041,988 B2 | 6/2021 | Fattal et al. |
| 11,048,036 B2 | 6/2021 | Ma et al. |
| 11,143,810 B2 | 10/2021 | Fattal et al. |
| 11,143,811 B2 | 10/2021 | Fattal et al. |
| 11,320,578 B2 | 5/2022 | Fattal et al. |
| 2006/0181895 A1 | 8/2006 | Hu et al. |
| 2009/0322986 A1 | 12/2009 | Wei et al. |
| 2011/0025825 A1* | 2/2011 | McNamer ............ H04N 13/221 348/46 |
| 2011/0050853 A1* | 3/2011 | Zhang .................. H04N 13/261 348/44 |
| 2011/0050864 A1* | 3/2011 | Bond ................... H04N 13/261 348/42 |
| 2011/0304693 A1* | 12/2011 | Border ................. H04N 13/261 348/46 |
| 2012/0013711 A1 | 1/2012 | Tamir et al. |
| 2012/0162374 A1 | 6/2012 | Markas et al. |
| 2012/0200807 A1 | 8/2012 | Wei et al. |
| 2012/0249536 A1* | 10/2012 | Sutou ....................... G06T 7/97 345/419 |
| 2013/0124998 A1 | 5/2013 | Pendergast et al. |
| 2013/0169518 A1 | 7/2013 | Wu et al. |
| 2013/0169748 A1* | 7/2013 | Corral-Soto ......... H04N 13/128 348/E13.064 |
| 2013/0215220 A1* | 8/2013 | Wang ................... H04N 13/296 348/E13.064 |
| 2016/0191903 A1* | 6/2016 | Zhang .................. H04N 13/261 348/46 |
| 2016/0286208 A1* | 9/2016 | Drouin ................. H04N 13/111 |
| 2017/0230644 A1* | 8/2017 | Takizawa ............ H04N 13/327 |
| 2017/0280090 A1* | 9/2017 | Raskin .................. H04N 13/30 |
| 2017/0363794 A1 | 12/2017 | Wan et al. |
| 2017/0366795 A1* | 12/2017 | Chou ................... H04N 13/398 |
| 2018/0012330 A1* | 1/2018 | Holzer ................. H04N 13/111 |
| 2018/0160107 A1 | 6/2018 | Sohn et al. |
| 2018/0253884 A1 | 9/2018 | Burnett, III et al. |
| 2019/0018186 A1 | 1/2019 | Fattal |
| 2019/0297258 A1 | 9/2019 | Trevor et al. |
| 2020/0018891 A1 | 1/2020 | Fattal et al. |
| 2020/0020151 A1 | 1/2020 | Lakshman et al. |
| 2020/0033621 A1 | 1/2020 | Fattal et al. |
| 2020/0301165 A1 | 9/2020 | Fattal |
| 2020/0310135 A1 | 10/2020 | Fattal |
| 2020/0364519 A1 | 11/2020 | Evangelidis |
| 2021/0116757 A1 | 4/2021 | Fattal |
| 2021/0157050 A1 | 5/2021 | Fattal |
| 2021/0209980 A1 | 7/2021 | Fattal |
| 2021/0217132 A1 | 7/2021 | McCombe et al. |
| 2021/0314556 A1 | 10/2021 | Fattal et al. |
| 2021/0333570 A1 | 10/2021 | Fattal et al. |
| 2021/0364816 A1 | 11/2021 | Fattal et al. |
| 2021/0390914 A1 | 12/2021 | Fattal |
| 2021/0407438 A1 | 12/2021 | Fattal |
| 2022/0035088 A1 | 2/2022 | Fattal et al. |
| 2022/0044644 A1 | 2/2022 | Fattal |
| 2022/0236596 A1 | 7/2022 | Fattal |
| 2023/0030728 A1 | 2/2023 | Dahlquist |

FOREIGN PATENT DOCUMENTS

| | | |
|---|---|---|
| EP | 4256782 | 10/2023 |
| JP | 2002077941 | 3/2002 |
| JP | 2005529559 A | 9/2005 |
| JP | 2011146825 A | 7/2011 |
| JP | 2011191556 A | 9/2011 |
| JP | 2012227724 | 11/2012 |
| JP | 2013021538 | 1/2013 |
| JP | 2013529864 A | 7/2013 |
| JP | 2013238716 | 11/2013 |
| JP | 2016059029 | 4/2016 |
| JP | 201908928 A | 3/2019 |
| JP | 2023551991 | 12/2023 |
| KR | 20160135660 | 11/2016 |
| KR | 20180119476 | 11/2018 |
| KR | 20230101880 | 7/2023 |
| TW | 202234882 | 9/2022 |
| TW | I817273 | 10/2023 |
| WO | WO-2011096252 A1 | 8/2011 |
| WO | WO-2012002017 A1 | 1/2012 |
| WO | WO-2012002021 A1 | 1/2012 |
| WO | 2012038856 A1 | 3/2012 |
| WO | WO-2012035783 A1 | 3/2012 |
| WO | WO-2012081127 A1 | 6/2012 |
| WO | 2017052983 A1 | 3/2017 |
| WO | 2021257639 A1 | 12/2021 |
| WO | 2022108609 A1 | 5/2022 |
| WO | 2022125128 | 6/2022 |

OTHER PUBLICATIONS

"Korean Application Serial No. 10-2023-7018931, Notice of Preliminary Rejection mailed Apr. 26, 2024", w English Translation, 13 pgs.

"European Application Serial No. 21904023.5, Response to Communication Pursuant to Rules 161(2) and 162 EPC filed Jan. 17, 2024", 22 pgs.

"Canadian Application Serial No. 3,201,940, Voluntary Amendment filed May 15, 2023", 33 pgs.

"Taiwanese Application Serial No. 110145027, Amendment filed Dec. 2, 2020", W English Claims, 48 pgs.

"Taiwanese Application Serial No. 110145027, Office Action mailed Jul. 26, 2023", W English Translation, 3 pgs.

"Taiwanese Application Serial No. 110145027, Office Action mailed Nov. 30, 2022", W English Translation, 22 pgs.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

(56) References Cited

OTHER PUBLICATIONS

International Search Report and Written Opinion (ISRWO) by International Searching Authority (ISA) Korean Intellectual Property Office (KIPO) dated Aug. 27, 2021 (10 pages) for foreign counterpart parent International Application No. PCT/US2021/020166.

Dongkyung Nam, et al. "2D/3D Mode Switchable Backlight Design", 2017 16th Workshop on Information Optics, Jul. 2017, 3 pages, IEEE.

Zhujun Shi and Federico Capasso, "Polarization-dependent metasurfaces for 2D/3D switchable displays", Proceedings of SPIE, Digital Optics for Immersive Displays, May 21, 2018, pp. 1067618-1 to 1067618-8, vol. 10676, Event: SPIE Photonics Europe, 2018, Strasbourg, France.

"Japanese Application Serial No. 2023-534391, Notification of Reasons for Refusal mailed Oct. 1, 2024", w English Translation, 16 pgs.

"European Application Serial No. 21904023.5, Extended European Search Report mailed Sep. 25, 2024", 12 pgs.

"Canadian Application Serial No. 3,201,940, Office Action mailed Oct. 3, 2024", 5 pgs.

"Canadian Application Serial No. 3,201,940, Response filed Jan. 8, 2025 to Office Action mailed Oct. 3, 2024", 38 pgs.

Hiroshi, Yoshikawa, "Development of 3D camera for high-density generation of directional image", Japan, A three-dimensional image conference executive committee with English abstract. pp. 229-232, [Online]. Retrieved from the Internet: URL:https: www.jstage.jst.go.jp article sanjigen 11 0 11_229 _pdf -char ja, (Jul. 1, 2003), 4 pgs.

"Japanese Application Serial No. 2023-534391, Response filed Feb. 28, 2025 to Notification of Reasons for Refusal mailed Oct. 1, 2024", 14 pgs.

"European Application Serial No. 21904023.5, Response filed Feb. 28, 2025 to Extended European Search Report mailed Sep. 25, 2024", 12 pgs.

"Korean Application Serial No. 10-2023-7018931, Notice of Preliminary Rejection mailed Feb. 20, 2025", W English Translation, 17 pgs.

"Japanese Application Serial No. 2023-534391, Notification of Reasons for Refusal mailed May 27, 2025", w/English Translation, 9 pgs.

\* cited by examiner

REAL-TIME MULTIVIEW VIDEO CONVERSION METHOD AND SYSTEM

CROSS-REFERENCE TO RELATED APPLICATIONS

This application is a continuation patent application of and claims priority to International Patent Application No. PCT/US2021/020166, filed Feb. 28, 2021, which claims the benefit of priority to U.S. Provisional Patent Application Ser. No. 63/122,419, filed Dec. 7, 2020, the entirety of each of which is incorporated by reference herein.

STATEMENT REGARDING FEDERALLY SPONSORED RESEARCH OR DEVELOPMENT

N/A

BACKGROUND

A video stream includes a series of frames, where each frame may be made up of a two-dimensional (2D) image. Video streams may be compressed according to a video coding specification to reduce the video file size alleviating network bandwidth. A video stream may be received by a computing device from a variety of sources. Video streams may be decoded and rendered for display by a graphics pipeline. The rendering of these frames at a particular frame rate produces a display of video.

Emerging display technologies such as holographic displays, three-dimensional (3D) displays, volumetric displays, lightfield displays, and other like displays may provide a more immersive viewing experience that conventional 2D video. The techniques to convert 2D video into different formats may involve significant pre-preprocessing efforts before the video can be rendered.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to convert a two-dimensional (2D) video stream into multiview video in real time. In particular, embodiments are directed to receiving a 2D video stream and dumping 2D frames of the 2D video stream into a buffer for conversion. The 2D video stream may represent a scene that is captured where the camera view moves along a linear or orbital direction with respect to the scene. This may involve panning along a particular direction or circling around an object. Embodiments are directed to calculating the different views of a multiview frame from a sampled subset of the 2D frames. Various multiview parameters such as, for example, a camera baseline or a center viewpoint, are used to define the target timestamps for each view in a multiview frame. Using the target timestamps, time-adjacent 2D frames are identified (e.g., sampled) and blended to generate each view of the multiview frame. The multiview frames may be generated in real time from an incoming 2D video stream to allow real-time conversion and rendering of a multiview video.

According to embodiments, by sampling 2D frames based on timestamps, multiview frames may be generated dynamically in real time. In addition, a user interface may allow for changes to the multiview parameters to be made on the fly, thereby adjusting a real-time rendered output dynamically.

Figure 1:
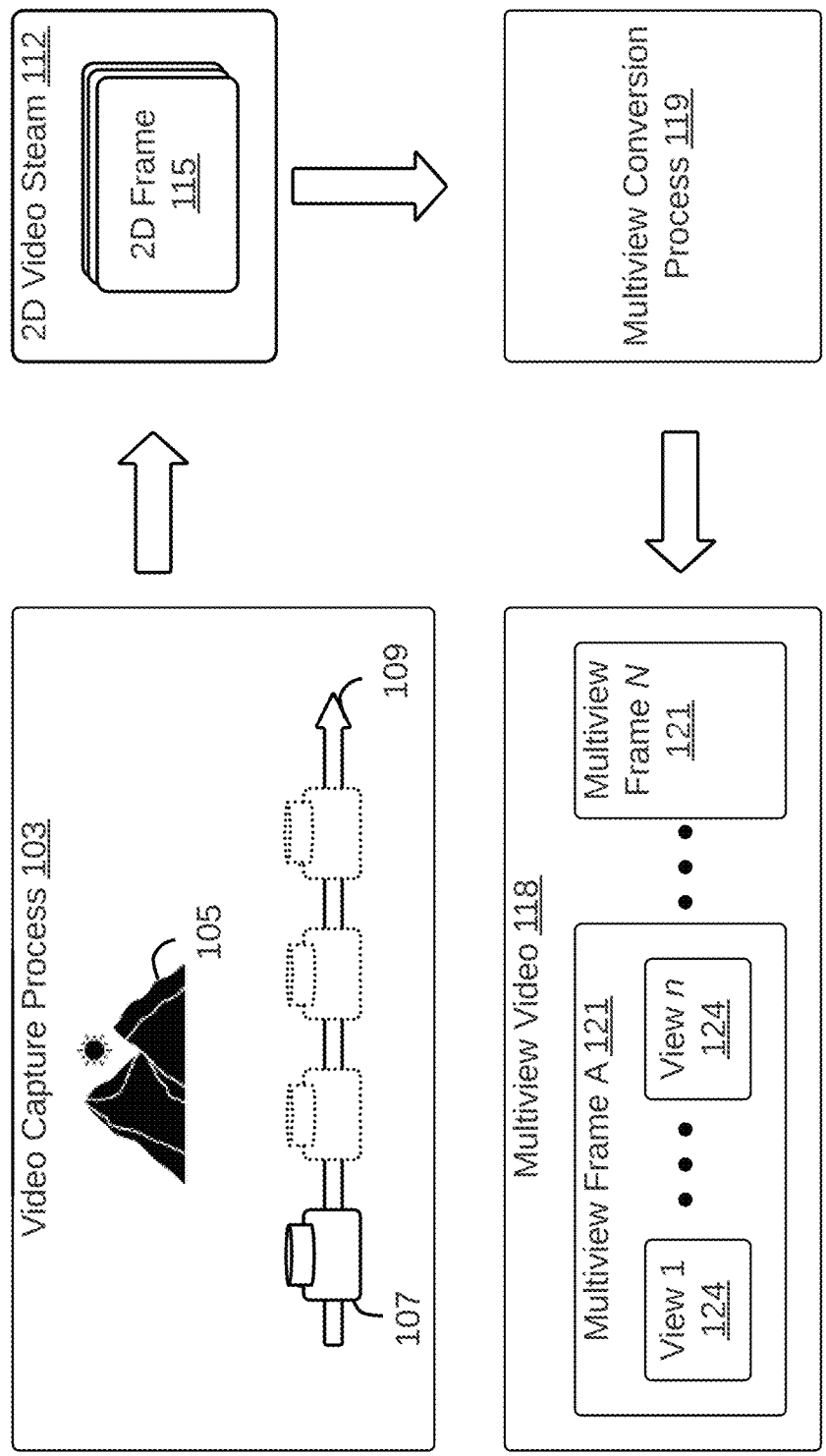
FIG. 1 provides an overview of a process for converting a two-dimensional (2D) video stream into multiview video according to an embodiment consistent with the principles described herein.

FIG. 1 provides an overview of a process for converting a two-dimensional (2D) video stream into multiview video according to an embodiment consistent with the principles described herein. A video capture process 103 involves capturing video of a scene 105. A scene 105 may be a physical arrangement of objects that are of interest to a viewer. The video capture process 103 may take place in a studio or any other physical environment. The goal is to visually capture the scene 105 using a camera 107. A camera 107 may capture video, where the video is made up of a series of time-sequenced images (referred to as frames). The camera may move along a particular direction 109 with respect to the scene to capture different angles of the scene 105. The direction 109 may be primarily linear or orbital to obtain different viewing angles of the scene.

The camera 107 may be attached to a vehicle that moves with respect to the scene 105. The vehicle may be a drone or other unmanned aerial vehicle (UAV). In some examples, the scene 105 may include on or more objects set on turntable that rotates with respect to a stationary camera 107. The video capture process 103 ultimately transforms the visual details of a scene that occupies physical space into a 2D video stream 112. The 2D video stream may be made up a series of time-sequenced, 2D frames 115. Each 2D frame 115 represents a single view of the scene at a particular point in time. Time may be recorded as a timestamp that is specific to a corresponding 2D frame. Rendering the 2D frames in sequence at a target frame rate results in 2D video perceived by a viewer.

While the 2D video stream 112 is described as video of a physical scene, it should be appreciated that the 2D video stream 112 may be generated by moving a virtual camera with respect to a 3D model. For example, gaming engines and other 3D model generators may allow for the creation of 2D video by applying a virtual camera (defined in terms of a location and a direction) to a 3D model (e.g., a volumetric model of a scene defined in terms of a point cloud, surface mesh, texture map, etc.).

The camera 107 may transmit or otherwise upload the 2D video stream to a repository via a network. The repository may include a memory storage, a server, a cloud-based storage, or other computing system that is configured to receive and store video files. The network may include the Internet, an intranet, a wireless network, a wired network, or any other network that facilitates the flow of data. The 2D video stream 112 may be coded according to a particular coding format. Coding involves applying a lossy or lossless compression to reduce the file size to accommodate the network bandwidth. The video coding format may be, for example, an H.264 format, an H.265 format, any format specified by the Moving Picture Experts Group (MPEG), etc. In addition, the 2D video stream 112 may be packetized for transmission over an Internet Protocol (IP) network.

A multiview video 118 may be generated from the 2D video stream 112 using a multiview conversion process 119. The multiview conversion process 119 is a computer-implemented process that converts the 2D video stream into multiview video 118 that may be rendered for display. The multiview conversion process 119 may be implemented as a software program, routine, or module executable by a processor. The multiview conversion process 119 may receive the 2D video stream 112 as a compressed, packetized data stream. For example, the multiview conversion process 119 may use an Application Programming Interface (API) or other function call to retrieve the 2D video stream 112 from the repository. The 2D video stream may be live video such that the video capture process 103 transmits 2D video stream as it is capturing video of the scene 105 and where the 2D video is streamed to a computing system that implements the multiview conversion process. In some embodiments, the 2D video stream 112 includes pre-recorded (not live) video that is configured to be streamed to a computing device upon request.

The multiview video 118 may be stored in memory as one or more computer files or other in other data formats. The multiview video 118 comprises a series of multiview frames 121 depicted as multiview frame A through multiview frame N. Multiview frames 121 are displayed in time sequence at a specified frame rate (expressed as a frame rate per second (FPS)). Thus, a multiview frame 121 is a multiview image.

Each multiview frame 121 is made up a plurality of views 124. For example, multiview frame A is depicted as having view 1 through view n, which may apply to each multiview frame 121 in the multiview video 118. In some embodiments, when rendered on a multiview display, each view 124 of a multiview frame 121 corresponds to a respective principle angular direction that at a surface normal with respect to the multiview display. As a result, multiple different views 124 can be perceived contemporaneously by a viewer. This results in a three-dimensional (3D) or lightfield image content.

Embodiments are directed to the multiview conversion process 119 that may convert a 2D video stream into multiview video on the fly in real time. Moreover, the multiview conversion process 119 allows for real-time rendering and display as the 2D video stream is received. Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions contemporaneously from the perspective of the user. In particular, the different views may represent different perspective views of a multiview frame.

A multiview display may be implemented using a variety of technologies that accommodate the presentation of different image views so that they are perceived contemporaneously. One example of a multiview display is one that employs diffraction gratings to control the principle angular directions of the different views. According to some embodiments, the multiview display may be a lightfield display, which is one that presents a plurality of light beams of different colors and different directions corresponding to different views. In some examples, the lightfield display is a so-called 'glasses free' three-dimensional (3D) display that may use diffractive gratings to provide autostereoscopic representations of multiview images without the need to special eye wear to perceive depth. In some embodiments, the multiview display may require glasses or other eyewear to control which views are perceived by each eye of the user.

As used herein, 'disparity' is defined as the difference between at least two views of a multiview image at corresponding locations. For example, in the context of stereoscopic vision, the left eye and right eye may see the same object but at slightly different locations due to the difference in viewing angles between the eyes. This difference may be quantified as disparity. The change in disparity across the multiview image conveys a sense of depth.

As used herein, 'baseline' or 'camera baseline' is defined as the distance between two cameras (or a single camera at different points in time) that capture corresponding views of a scene. For example, in the context of stereoscopic vision, the baseline is the distance between the left eye and right eye. A larger baseline leads to increased disparity and may enhance the 3D effect of the multiview image.

As used herein, 'convergence offset' refers to the distance between the camera and a point along the plane of convergence. Modifying the convergence offset will change the location of the plane of convergence so as to refocus the multiview image on new objects at a different depth.

Further, as used herein, the article 'a' is intended to have its ordinary meaning in the patent arts, namely 'one or more'. For example, 'a processor' means one or more processor and as such, 'the memory' means 'one or more memory components' herein.

Figure 10:
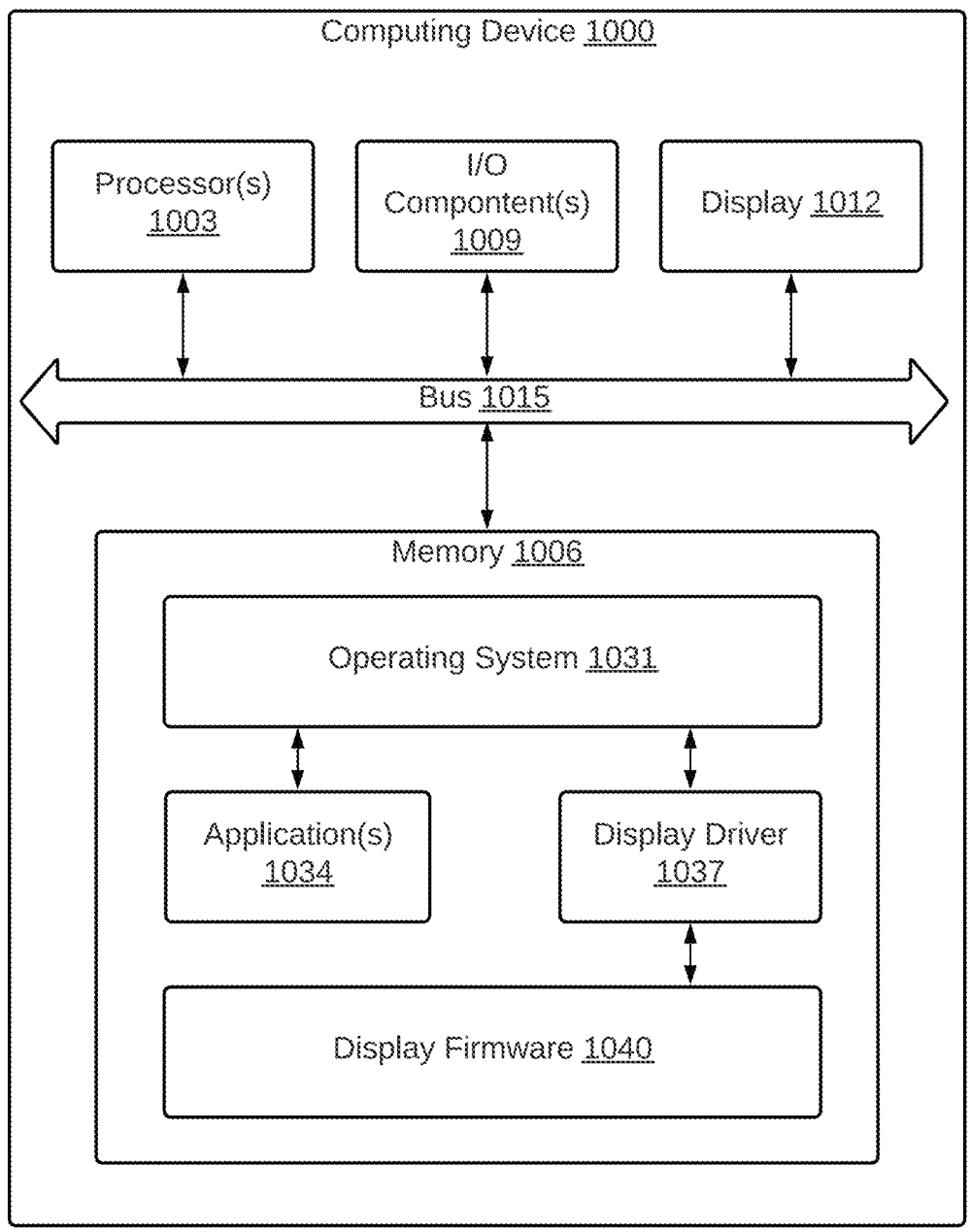
FIG. 10 is a schematic block diagram that depicts an example of a computing device that performs real-time multiview video conversion according to an embodiment consistent with the principles described herein.

Embodiments are directed to a computer-implemented method of real-time multiview video conversion. FIG. 10, which is discussed in further detail below, provides an example of a computing device that is configured to implement a method of real-time multiview video convergence. The multiview conversion process 119, discussed above with respect to FIG. 1 may be configured to perform real-time multiview conversion. Real-time multiview conversion may include receiving a video stream comprising two-dimensional (2D) frames, where each 2D frame corresponds to a respective 2D video timestamp. Real-time multiview conversion may include identifying a camera baseline and a center viewpoint. Real-time multiview conversion may further include determining a target timestamp for a view of a multiview frame based on the camera baseline and the center viewpoint. Real-time multiview conversion may further include generating the view from a subset of 2D frames having 2D video timestamps adjacent to the target timestamp. Real-time multiview conversion may further include rendering a multiview video for display, the multiview video comprising the view of the multiview frame.

In some embodiments, the real-time multiview conversion may include decoding the video stream to extract the 2D frames in a graphics processing unit (GPU) memory. In some embodiments the real-time multiview conversion may include loading the 2D frames from the GPU memory to a central processing unit (CPU) memory to generate the view. In some embodiments the real-time multiview conversion may include rendering a multiview video for display while receiving the video stream.

Some embodiments are directed to a user interface that obtains user-specified parameters and applies those user-specified parameters during multiview video conversion on the fly. For example, the real-time multiview conversion may include receiving user input via a user interface, the user input comprising at least one of the camera baseline and the center viewpoint. In some embodiments, the real-time multiview conversion may include dynamically updating the camera baseline and the center viewpoint while rendering the multiview video.

In some embodiments, the view is generated by blending the set of 2D frames. In some embodiments, the real-time conversion process includes determining the time differences between the target timestamp and the 2D video time adjacent to the target timestamp; and may further include performing a weighted blend proportional to the time differences to generate the view. In some embodiments, the blending of 2D frames may be performed using motion-based blending.

Figure 2:
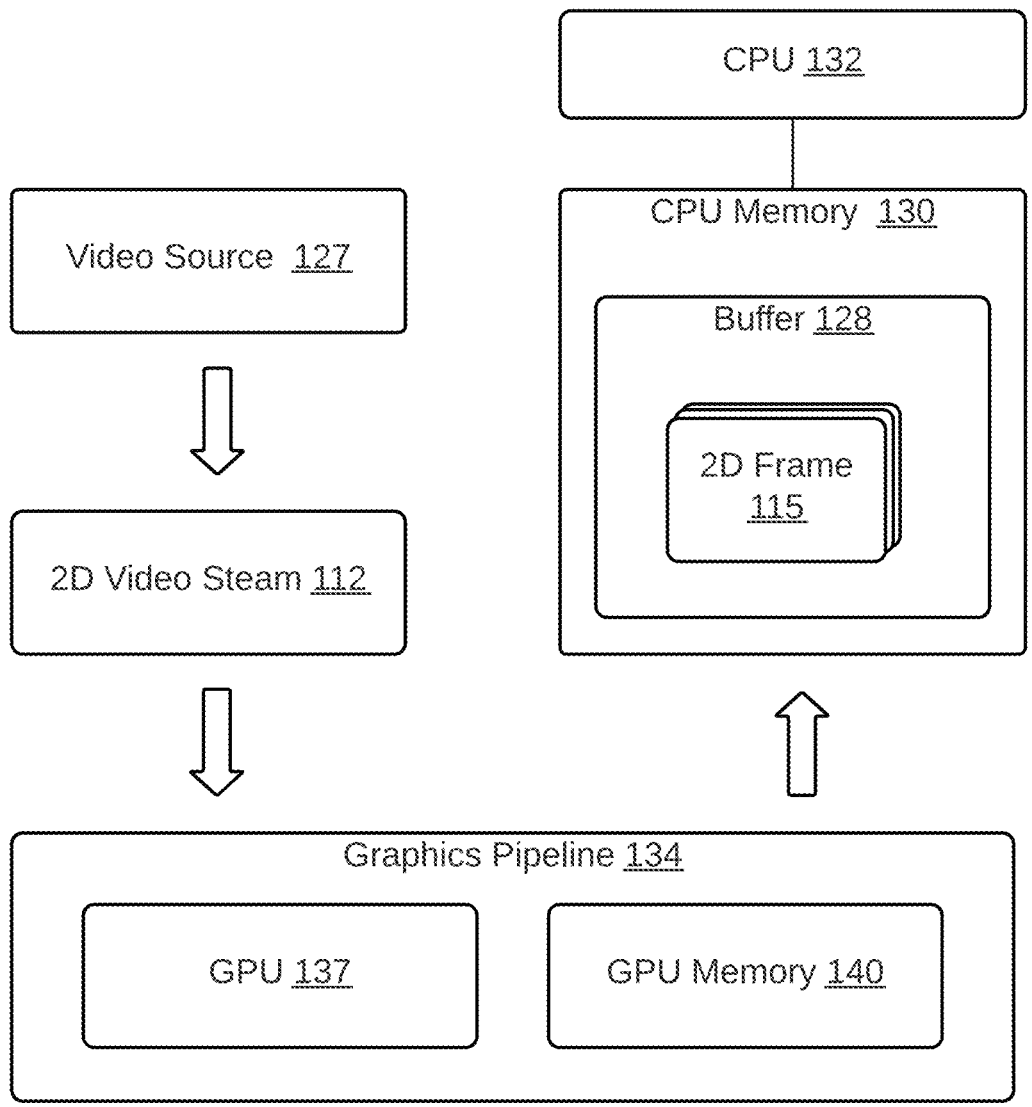
FIG. 2 illustrates receiving a 2D video stream and loading 2D frames into a buffer according to an embodiment consistent with the principles described herein.

FIG. 2 illustrates receiving a 2D video stream and loading 2D frames into a buffer according to an embodiment consistent with the principles described herein. In this respect, FIG. 2 illustrates at least a portion of a real-time multiview video conversion. For example, FIG. 2 depicts receiving a 2D video stream 112 comprising two-dimensional (2D) frames, each 2D frame (e.g., 2D frames 115) corresponding to a respective 2D video timestamp. A timestamp may be value reflecting a relative or absolute time in any unit of time (e.g., seconds, date/time, etc.). Each 2D frame may include a timestamp to organize the frames in a time series.

The 2D video stream 112 may be received by a computing device from a video source 127. The video source 127 may be remotely located with respect to the computing device and coupled to the computing device over a wireless or wired network connection. The network connection may be an Internet connection, Intranet connection, peer-to-peer connection, or any other network connection. In this respect, the 2D video stream 112 may be downloaded from a remote computing system over the network (e.g., real-time streaming). The video source 127 may also be local with respect to the computing device. For example, the video source 127 may include a camera application that receives video captured by a local camera in communication with the computing device. The camera application may convert the video feed from a local camera into the 2D video stream 112. In some instances, the 2D video stream 112 may be formatted in a native format such that it is not coded or otherwise compressed. In various embodiments, the 2D video source represents live video obtained from a video capture process 103 in real time.

2D frames 115 that are part of the 2D video stream 112 may be extracted and loaded into a buffer 128. The buffer 128 may be defined as an address space that is part of central processing unit (CPU) memory 130, where the CPU memory that is utilized by a CPU 132. The CPU 132 may be a generic processor that executes instructions, supports an operating system, and provides applications (e.g., user-level applications). The CPU memory 130 may be system memory that is accessible to an operating system or applications that execute on the computing device. The computing device may include a graphics pipeline 134 that receives the 2D video stream. A 'graphics pipeline,' as used herein, is defined as a computer-implemented environment that renders image data for display. A graphics pipeline 134 may include one or more graphics processing units (GPUs) 137 or other specialized processing circuits that are optimized for rendering image content to a screen. For example, a GPU 137 may include vector processors that execute an instruction set to operate on an array of data in parallel. The graphics pipeline 134 may include a graphics card, graphics drivers, or other hardware and software used to render graphics. The graphics pipeline 134 may be configured to render images on a multiview display. The graphics pipeline 134 may map pixels onto corresponding locations of a display and control the display to emit light to display a rendered image. The graphics pipeline 134 may also include GPU memory 140. GPU memory 140 may include one or more memory devices used by the graphics pipeline 134.

In some embodiments, the graphics pipeline 134 is a subsystem that is separate from the CPU 132. For example, the graphics pipeline 134 may include a GPU 137 that are separate from the CPU 132. In some embodiments, the graphics pipeline 134 is implemented purely as software by the CPU 132. For example, the CPU 132 may execute software modules that operate as a graphics pipeline 134 without specialized graphics hardware. In some embodiments, portions of the graphics pipeline 134 are implemented in specialized hardware while other portions are implemented as software modules by the CPU 132.

The graphics pipeline 134 may be used for decoding the video stream to extract the 2D frames in a GPU memory 140. For example, the graphics pipeline 134 may decode the 2D video stream 112 to identify the 2D frames according to a coding format. For example, in the MPEG coding format, frames may be formatted as an I-frame, P-frame, B-frame, etc. The graphics pipeline 134 may store the decoded 2D frames in GPU memory 140. These decoded 2D frames may then be loaded into the buffer 128 using a frame dumping process.

While FIG. 2 shows a graphics pipeline 134 that performs the decoding and the frame extraction, it should be appreciated that a dedicated hardware or software decoder may be used to load 2D frames 115 into the buffer 128 after decoding the 2D video stream 112. Upon extracting the 2D frames 115 from the 2D video stream 112 and loading them into the buffer 128, the real-time multiview video conversion then operates on the buffered 2D frames as described in further detail below.

Figure 3:
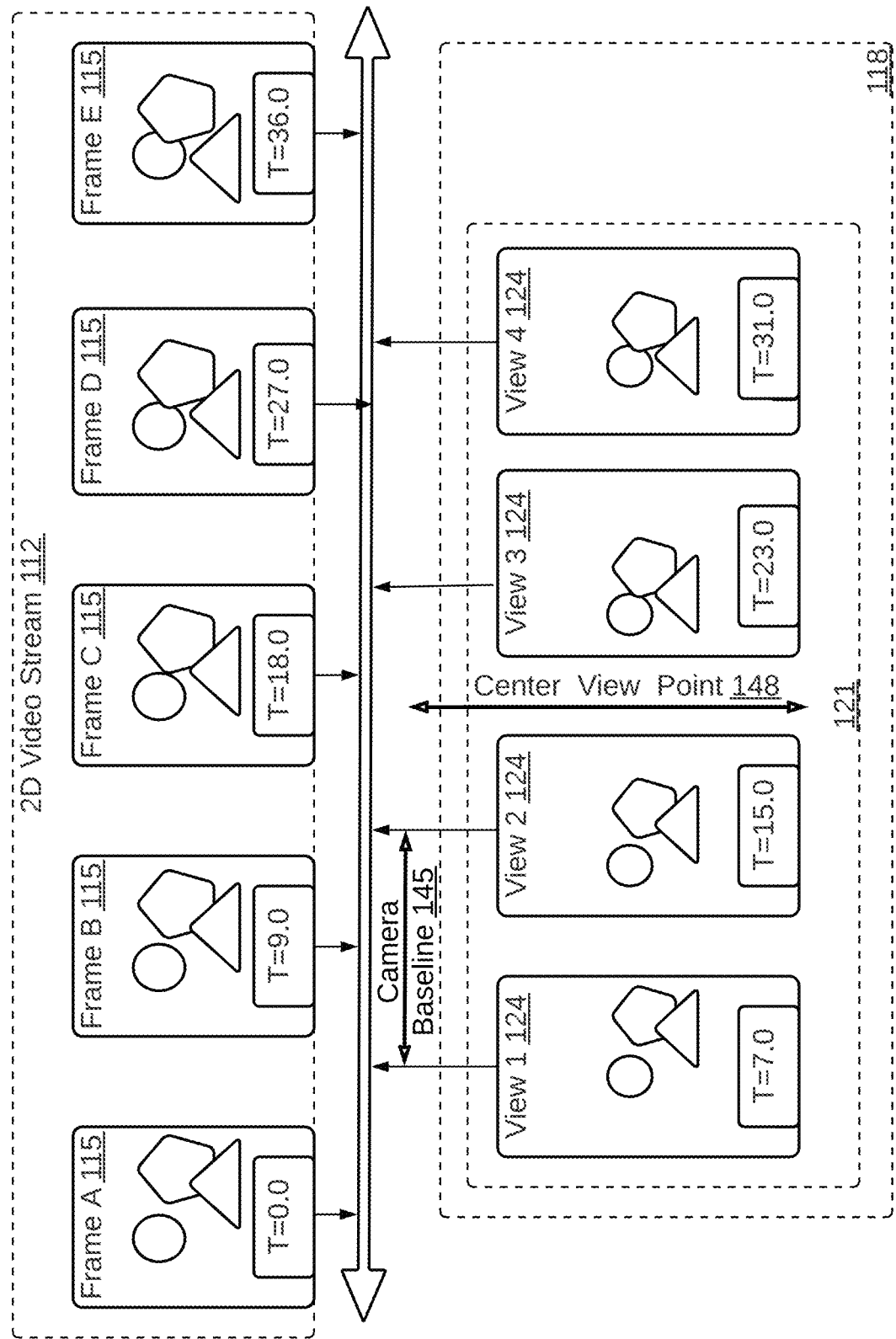
FIG. 3 illustrates an example of generating a view of a multiview video frame from a subset of 2D frames according to an embodiment consistent with the principles described herein.

FIG. 3 illustrates an example of generating a view of a multiview video frame from a subset of 2D frames according to an embodiment consistent with the principles described herein. As shown in the example of FIG. 3, the 2D frames are part of a 2D video stream 112. Each 2D frame represents a snapshot of a scene, where the scene is made up of objects (e.g., depicted as a circle, a triangle, a pentagon) at varying depths. Moreover, the 2D video stream 112 represents the scene as the camera pans in the horizontal direction with respect to the viewer.

FIG. 3 depicts a real-time multiview video conversion using 2D frames 115 that may be loaded into a buffer 128 as an input into the conversion process. This example shows a series of 2D frames 115 depicted as frame A through frame E. Each 2D frame 115 corresponds to a respective 2D video timestamp (shown as generic time units). For example, frame A has a timestamp of 0.0, frame B has a timestamp of 9.0, frame C has a timestamp of 18.0, frame D has a timestamp of 27.0, and frame E has a timestamp of 36.0. The time interval between adjacent frames is therefore 9.0 units of time. The timestamp for each frame may be stored as metadata.

The computer-implemented method of real-time multiview video conversion involves generating multiview video 118 from the 2D frames in the 2D video stream 112 using the timestamp for each 2D frame. Specifically, this involves generating a series of multiview frames 121, where each multiview frame includes a set of different views. The example of FIG. 3 uses four views 124 to define each multiview frame 121, view 1, view 2, view 3, and view 4. It should be appreciated that any number of different views may be used to define the multiview frame 121.

To generate each of the views (e.g., views 1-4 124), the real-time multiview video conversion process may involve identifying a camera baseline 145 and a center viewpoint 148. The camera baseline 145 and the center viewpoint 148 are multiview parameters that control where to sample 2D frames to generate the different views of a multiview frame 121. The camera baseline 145 quantifies the distance between the camera positions (e.g., a virtual or physical camera) that is associated with corresponding views. A large camera baseline 145 implies that two views of a scene are taken from points that are far apart. In this respect, there is greater overall disparity between the views as the camera baseline 145 increases. While camera baseline 145 can be characterized as a distance in terms of space between two points of views, the camera baseline 145 may also be expressed as a time difference for purposes of multiview video conversion. For example, the camera baseline 145 that is expressed as a spatial distance may also be expressed as a temporal distance based on the linear or orbital motion of the camera. In this example, the camera baseline 145 is 8.0 units of time.

The center viewpoint 148 specifies a midpoint between the range of views in a multiview frame 121. For example, the center viewpoint 148 is a position that may be equidistant to a left-most view and a right-most view. The center viewpoint 148 may be a position that is expressed as a spatial distance between viewpoints of the multiview frame 121 or a temporal distance based on a point of time to construct a multiview frame 121. In some embodiments, one or both of the camera baseline 145 and the center viewpoint 148 may be predetermined parameters stored in memory or otherwise hardcoded. The camera baseline 145 and the center viewpoint 148 may be identified by performing a look-up or other read command to determine the values that represent the camera baseline 145 and the center viewpoint 148. In other embodiments, one or both of the camera baseline 145 and the center viewpoint 148 may be user-specified. Moreover, one or both of the camera baseline 145 and the center viewpoint 148 may be changed dynamically in response to user input during real-time multiview video conversion.

The real-time multiview video conversion may also include determining a target timestamp for a view of a multiview frame 121 based on the camera baseline 145 and the center viewpoint 148. The camera baseline 145 and the center viewpoint 148 may be used to calculate the target timestamp for each view before the view is generated. For example, the center viewpoint 148 may specify a center point in time for the multiview frame 121 and the camera baseline 145 may define the time intervals between each view as they are positioned around the center point in time.

For example, FIG. 3 depicts generating four views 124 (e.g., view 1 through view 4) of a particular multiview frame 121 by sampling 2D frames 115 (e.g., frame A through frame E). Target timestamps are calculated from a camera baseline 145 of 7.0 units of time and a center viewpoint 148 of 17.0 units of time for the multiview frame 121. Using this camera baseline 145 and center viewpoint 148, view 1 has a target timestamp of 7.0 units of time, view 2 has a target timestamp of 15.0 units of time, view 3 has a target timestamp of 23.0 units of time, and view 4 has a target timestamp of 31.0 units of time. Each of the views 124 are separated by the camera baseline 145 expressed as units of time (e.g., 8.0 units of time). In addition, the middle views 124 (e.g., view 2 and view 3) are positioned on either side (e.g., time equidistant) of the center viewpoint 148. Thus, to construct the multiview frame 121, a target timestamp for each of its views is determined. As a result, a set of target timestamps are determined for each multiview frame 121.

The real-time multiview video conversion may also include generating the view from a subset of 2D frames 115 having 2D video timestamps adjacent to the target timestamp. For example, each view of the multiview frame 121 is generated from a subset of the 2D frames upon determining the target timestamp. The subset of 2D frames 115 may be at least a pair of 2D frames 115 that are timestamp-adjacent to the target timestamp. For example, to generate view 1, the target timestamp is 7.0 units of time. The subset of 2D frames 115 having 2D video timestamps adjacent to this target timestamp are frame A and frame B. To generate view 2, the set of 2D frames 115 having 2D video timestamps adjacent to this target timestamp are frame B and frame C. To generate view 3, the set of 2D frames 115 having 2D video timestamps adjacent to this target timestamp are frame C and frame D. And, to generate view 4, the set of 2D frames 115 having 2D video timestamps adjacent to this target timestamp are frame D and frame E. The 2D frames 115 having 2D video timestamps adjacent to this target timestamp may include least the two 2D frames 115 nearest to the target timestamp in terms of time.

Upon identifying the subset of 2D frames 115 having 2D video timestamps adjacent to this target timestamp for a particular view, the view 124 is generated by combining the subset of 2D frames 115. For example, the view is generated by blending the subset of 2D frames. In some embodiments, the blending may be a linear blending. In other embodiments, the blending may be motion-based blending. The blending may be a pixel-by-pixel blending operation. Examples of generating a view 124 from a subset of sampled 2D frames 115 using a blending operation is described in greater detail with respect to FIGS. 7A and 7B.

The real-time multiview video conversion may also include rendering a multiview video 118 for display, the multiview video 118 comprising the view of the multiview frame 121. For example, upon generating each view of each multiview frame 121, the multiview frames may be formatted as multiview video 118 in a predefined video format. In addition, the real-time multiview video conversion may include rendering the multiview video 118 for display while receiving the video stream. This allows video to be presented in a multiview format on the fly as 2D video is received. This is discussed in greater detail with respect to FIG. 5.

Referring back to FIG. 2, the real-time multiview conversion may include decoding the video stream to extract the 2D frames in a GPU memory 140. The 2D video stream 112 may be initially coded according to a predefined coding format. The 2D frames 115 (e.g., frame A through frame E) may initially be coded or otherwise compressed for reducing the file size of the 2D video stream. After decoding the 2D frames into GPU memory 140, the real-time multiview conversion may include loading the 2D frames from the GPU memory 140 to a CPU memory 130 to generate the view 124 (e.g., view 1 through view 4). Specifically, the real-time multiview conversion may dump the 2D frames 115 into a buffer 128 in real-time upon decoding.

Figure 4:
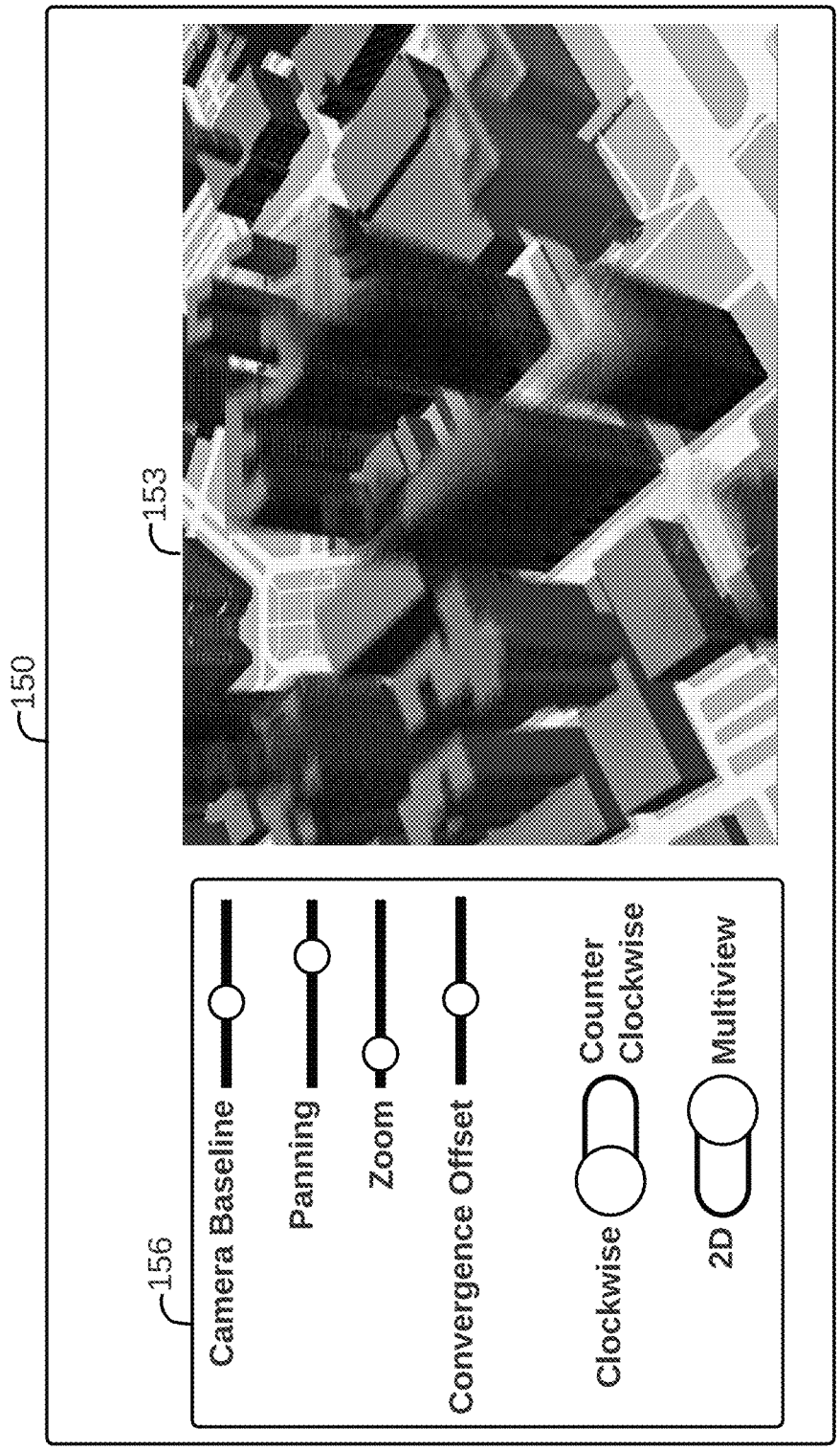
FIG. 4 illustrates an example of a user interface for receiving multiview parameters according to an embodiment consistent with the principles described herein.

FIG. 4 illustrates an example of a user interface for receiving multiview parameters according to an embodiment consistent with the principles described herein. The real-time multiview video conversion may be implemented by an application that generates a user interface 150 for receiving user input. For example, the real-time multiview video conversion may include receiving user input via a user interface 150, the user input comprising at least one of the camera baseline 145 or the center viewpoint 148. In addition, the real-time multiview video conversion may include dynamically updating the camera baseline 145 and the center viewpoint 148 while rendering the multiview video 118. As a result, a user can dynamically modify various multiview parameters on the fly as a 2D video stream is converted to multiview video 118 to dynamically change multiview properties of the multiview video.

The user interface 150 may include a first area 153 that displays the rendered multiview video 118. The user interface 250 may include a second area 156 that contains various user interface elements. User interface elements may be, for example, sliders, checkboxes, text fields, buttons, switches, etc. The second area 156 may be overlaid on the first area 153 or positioned next to the second area 156. The user may interact with various user interface elements using a curser, mouse, keyboard, or touch screen interface.

The user interface 150 may receive a user selection for a camera baseline 145, a panning setting, a zoom setting, a convergence offset, a clockwise/counter-clockwise selection, a 2D/multiview selection, or any other video setting. The camera baseline 145 controls the target timestamps of the views of a multiview frame that may be dynamically generated in real time. For example, the panning setting may shift the field of view, thereby specifying the center viewpoint 148. Panning to the left or right may cause the center viewpoint 148 to shift proportionally. The zoom setting may adjust a crop area applied to each multiview frame 121. For example, a user may pinch-to-zoom or otherwise manipulate a zoom slider to specify a region of the rendered multiview video from which to zoom in or zoom out. 2D frames 115 or multiview frames 121 may be processed dynamically in response to user-specified video settings.

A user may specify a convergence offset. The convergence offset may be applied to the multiview frames 121 to change the location of the plane of convergence as the multiview video is rendered. The location of the plane of convergence may be modified so that it moves closer to or away from the viewer. Assuming the case of horizontal disparity (e.g., where the scene is captured as it moves relative to the camera in the horizontal direction), the convergence offset may be modified by performing a horizontal pixel shift operation on one or more of the views. A horizontal pixel shift operation may involve cropping the left or right edges of each view to effectively shift the view horizontally. As a result, views on the left side of the center viewpoint 148 may shift further left while views on the right side of the center viewpoint 148 may shift further right. Alternatively, views on the left side of the center viewpoint 148 may shift further right while views on the right side of the center viewpoint 148 may shift further left. The amount of one or both of horizontal shifting and direction of shifting corresponds to the convergence offset.

A user may also specify a view order by selecting a clockwise or counter-clockwise selector. For example, FIG. 3 depicts a clockwise direction where view 1 is positioned as the left-most view while view 4 is positioned as the right-most view. The view order may be modified to be in the counter-clockwise direction so that view 4 is positioned as the left-most view, view 3 is positioned as the left-center view, view 2 is positioned as the right-center view, and view 1 is positioned as a right-most view. It may be desirable for the user to modify the view order (e.g., clockwise or counter-clockwise) depending on the direction of the overall motion of the scene (e.g., panning to the left, panning to the right, etc.).

The user interface 150 may include various other image processing operations that adjust the final rendering of the multiview video. User-specified parameters may be provided on the fly in real time during real-time multiview video conversion.

In some embodiments, the user interface 150 includes a selector to choose between rendering the 2D video stream in its original 2D format or rendering the 2D video stream as a multiview video. The viewer may cause the computing device to switch between rendering the multiview video and rendering the 2D video stream in response to user input received via the user interface. Selecting a 2D format may bypasses the multiview video conversion.

Figure 5:
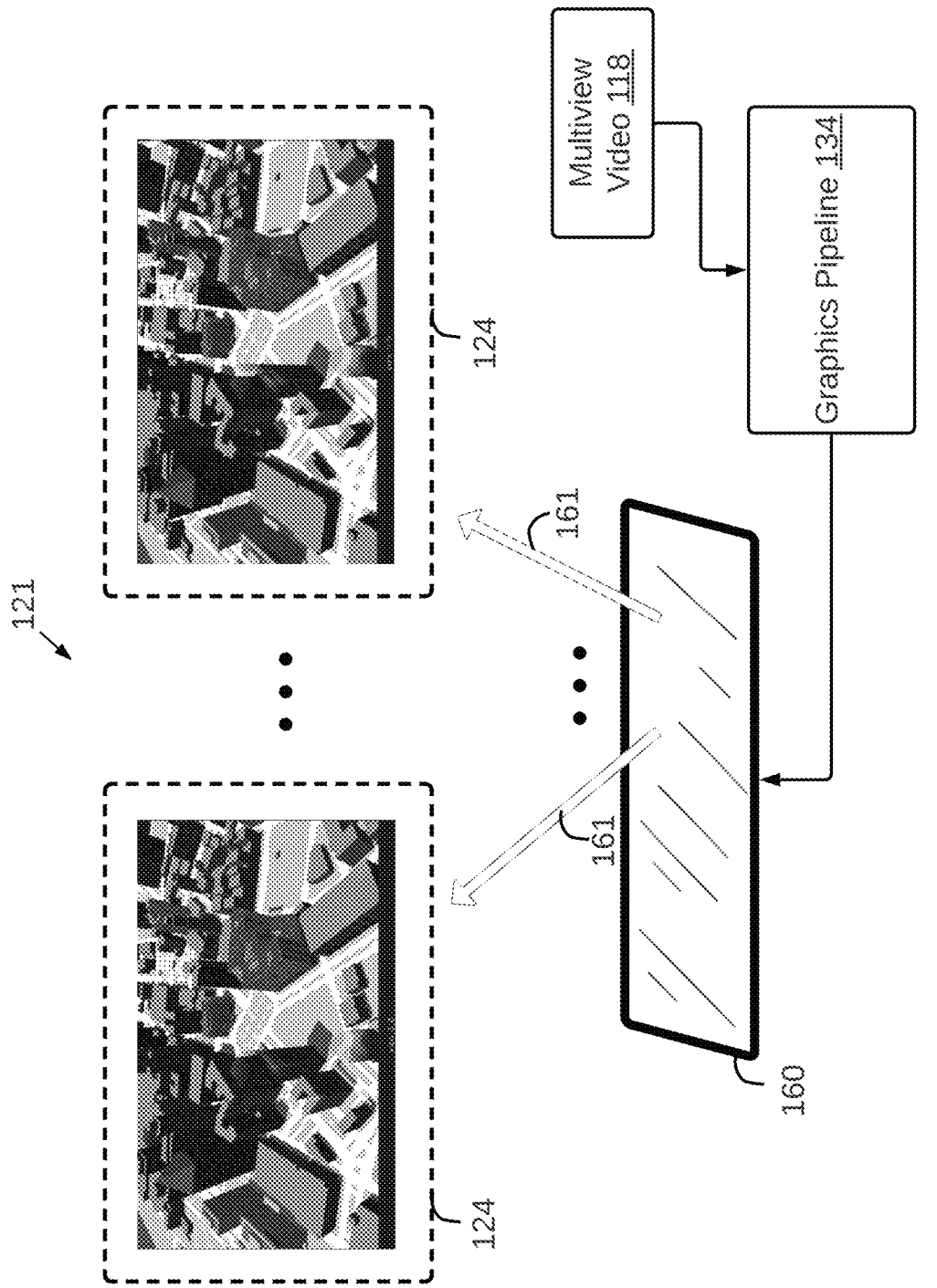
FIG. 5 illustrates an example of rendering a multiview video for display according to an embodiment consistent with the principles described herein.

FIG. 5 illustrates an example of rendering a multiview video for display according to an embodiment consistent with the principles described herein. For example, FIG. 5 depicts an example of rendering a multiview video 118 for display, the multiview video comprising multiview frames 121, each multiview frame comprising a respective set of different views 124 (e.g., view 1 through view 4). As discussed above, an application may provide real-time multiview video conversion that generates a multiview video comprising multiview frames 121 from a 2D video stream. Upon generating the multiview video, the application may interface with a graphics pipeline 134 to render the multiview video comprising multiview frames 121 on a multiview display 160. The graphics pipeline 134 may map each view 124 of each multiview frame 121 to a corresponding pixel location on the multiview display 160. As a result, each view 124 may correspond to a respective principle angular direction 161. While FIG. 5 provides one example of a multiview display 160, other implementations may be used to display multiview images. For example, some implementations may require special eyeglasses to perceive different views.

Figure 6:
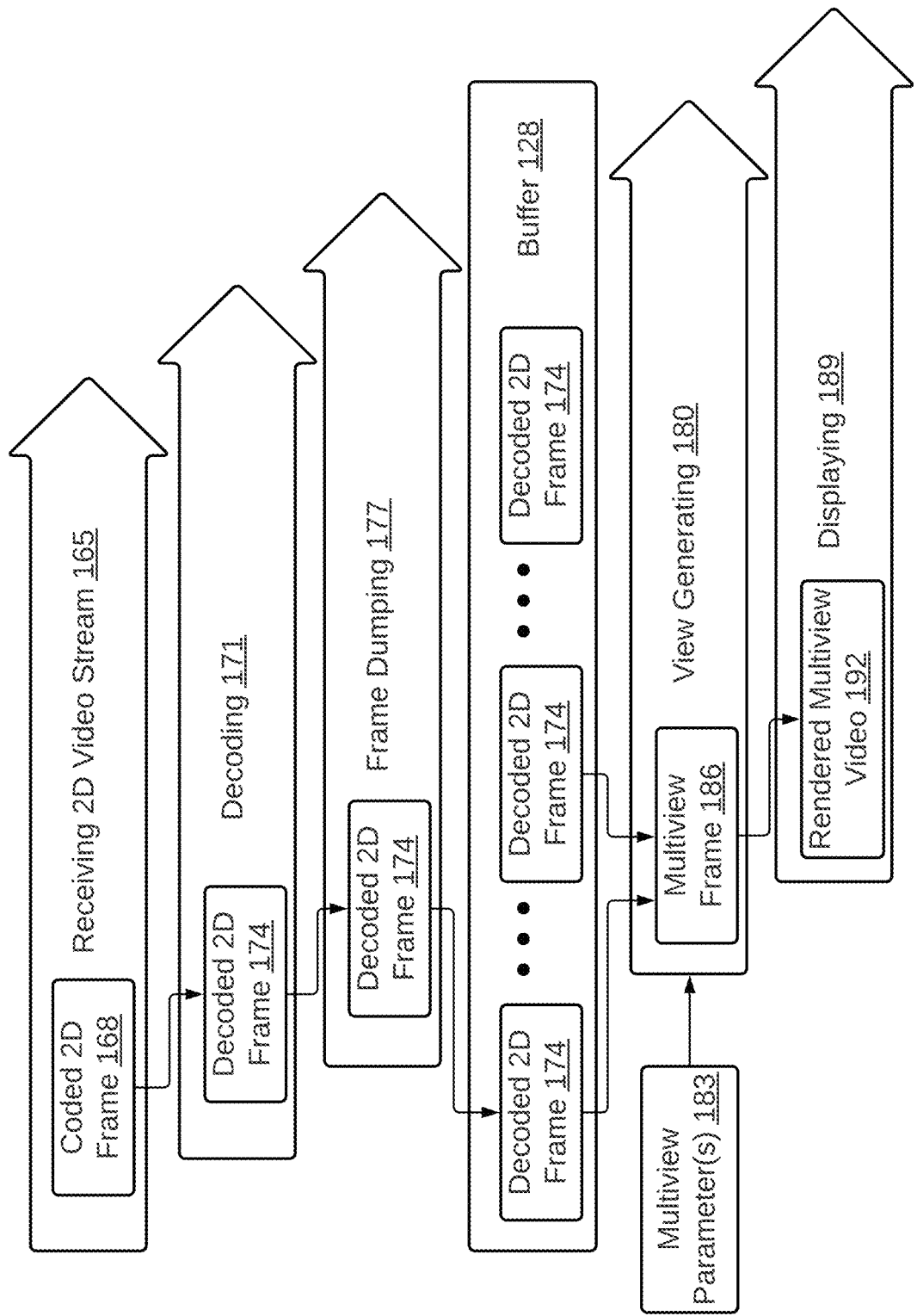
FIG. 6 illustrates an example of real-time conversion and rendering of multiview video for display while receiving a 2D video stream as an input according to an embodiment consistent with the principles described herein.

FIG. 6 illustrates an example of real-time conversion and rendering of multiview video for display while receiving a 2D video stream as an input according to an embodiment consistent with the principles described herein. As shown in FIG. 6, embodiments are directed to a real-time multiview video conversion that allows for rendering the multiview video for display while receiving the video stream. FIG. 6 depicts various computing processes that may be pipelined to effect parallel processing.

The real-time multiview conversion may begin by receiving a 2D video stream 165. The 2D video stream may comprise a series of 2D frames 115 that are formatted as coded 2D frames 168 according to a video coding format. Specifically shown is a coded 2D frame 168 contained within the 2D video stream.

As the 2D video stream is received, the real-time multiview video conversion may perform decoding 171. Decoding may involve decompressing or otherwise extracting 2D frames from the 2D video stream. A graphics pipeline 134, a software decoder, or hardware decoder may perform the decoding 171. The coded 2D frame 168 is decoded into a decoded 2D frame 174. Next, as 2D frames are decoded, the real-time multiview video conversion may perform frame dumping 177. Frame dumping 177 may involve populating a buffer 128 with the decoded 2D frames 174 as they are being decoded. In this respect, the buffer 128 may be an address space in CPU memory or other system memory that contains recently decoded 2D frames 174. In some embodiments the buffer 128 is a circular buffer that replaces old decoded 2D frames with newly decoded 2D frames.

Next, as the buffer 128 is loaded with the recently decoded 2D frames 174, the real-time multiview video conversion performs view generating 180 to generate the views of each multiview frame. Specifically shown in FIG. 6 is how a particular multiview frame 186 is generated from a plurality of decoded 2D frames 174 that are sampled from the buffer 128. For example, this may involve generating each view from a subset of 2D frames having 2D video timestamps adjacent to a target timestamp of the view. While generating views, multiview parameters 183 may be identified. Multiview parameters 183 may include, for example, data indicating a camera baseline 145, a center viewpoint 148, a convergence offset, or other parameters that control how the views of a multiview frame should be generated and control which 2D frames to sample when generating the views. Multiview parameters 183 may be identified by reading the multiview parameters 183 from memory. The multiview parameters 183 may be user-specified via a user interface. As a result, view generating 180 may be controlled in real time by a user who provides user input to change how 2D frames are sampled for view generation.

Next, the real-time multiview video conversion may include displaying 189. Displaying 189 may involve rendering the multiview video for display while receiving the 2D video stream. The multiview video is made up of a time series of multiview frames 186 that forms part of the rendered multiview video 192. A graphics pipeline may map pixels of different views to corresponding locations of multiview display to present the multiview video to a user.

Figure 7A:
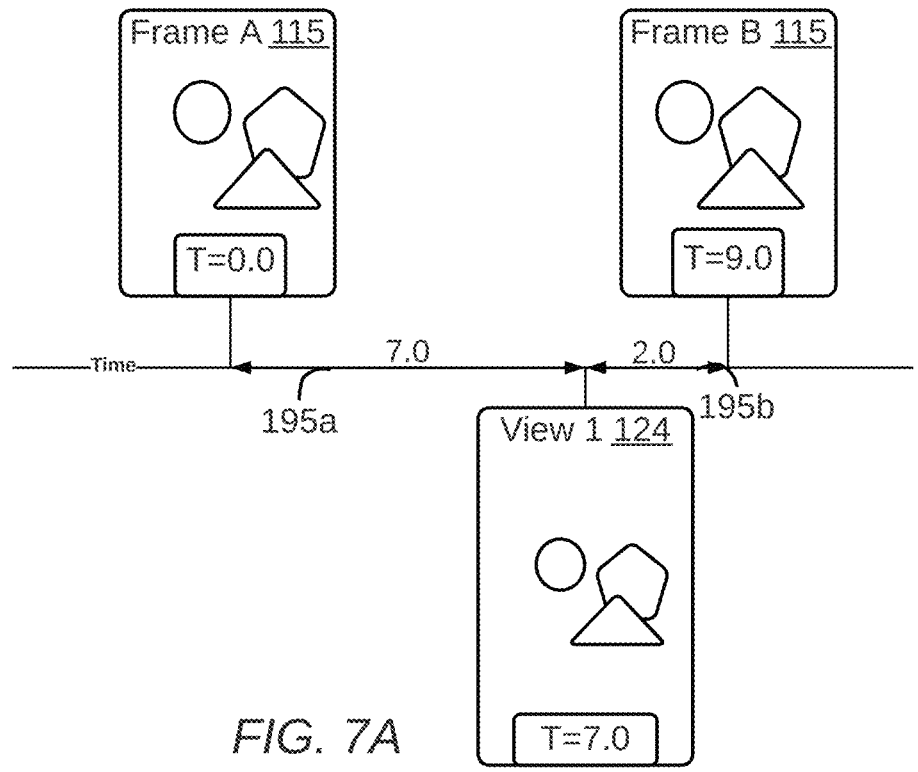
FIG. 7A illustrates an example of performing a weighted blend proportional to time differences of time-adjacent 2D frames to generate a view according to an embodiment consistent with the principles described herein.
Figure 7B:
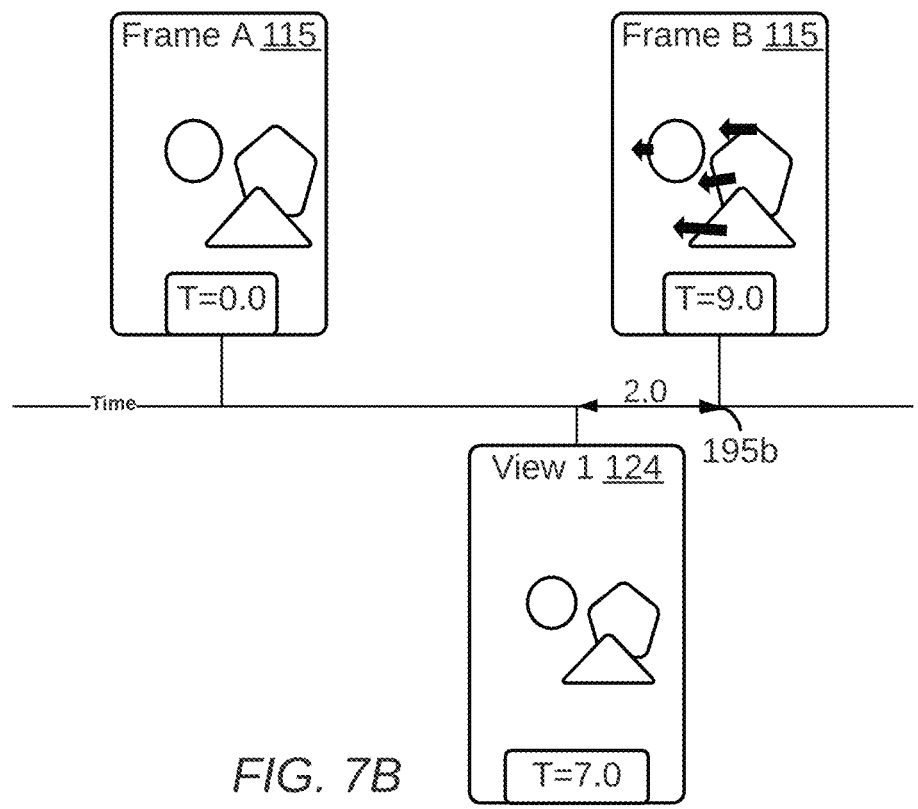
FIG. 7B illustrates an example of performing a motion-based blend of time-adjacent 2D frames to generate a view according to an embodiment consistent with the principles described herein.

FIGS. 7A and 7B provide examples of a view being generated by blending a subset of 2D frames. In particular, FIG. 7A illustrates an example of performing a weighted blend proportional to time differences of time-adjacent 2D frames to generate a view according to an embodiment consistent with the principles described herein. Herein, a 'weighted blend' is defined as sum or other combination of two variables (e.g., pixel values), where each variable is weighted according to a respective coefficient (e.g., the weight). For example, to generate view 1, a target timestamp is calculated for view 1, which is 7.0 units of time. A subset of time-adjacent 2D frames is identified based on the target timestamp, which are frame A and frame B. The weighted blend may be a weighted blend proportional to the time differences between the time-adjacent frames (e.g., frame A and frame B). The coefficient in the weighted blend corresponds to the time difference. For example, the blending operation may involve determining the time differences between the target timestamp and the 2D video timestamps adjacent to the target timestamp. For example, view 1 may have a time difference 195$a$ of 7.0 time units with respect to frame A and a time difference 195$b$ of 2.0 time units with respect to frame B. Thus, view 1 is quantifiably closer to frame B than frame A. Upon determining these time differences 195$a$, 195$b$, view 1 may be generated by performing a weighted blend proportional to the time differences to generate the view 124. This may involve performing a linear pixel blending that is weighted according to these time differences. As a result, view 1 will be appear more like frame B than frame A.

FIG. 7B illustrates an example of performing a motion-based blend of time-adjacent 2D frames to generate a view according to an embodiment consistent with the principles described herein. For example, using motion estimation techniques, an optical flow between the time-adjacent 2D frames may be determined. An optical flow is a set of data comprising vectors that express how features have moved from an initial frame to a subsequent frame. In this respect, the optical flow contains the velocities of different objects or pixel groupings from one frame to the next. The optical flow may be formatted as a matrix of vectors. FIG. 7B shows frame B with optical flow data overlaid showing the velocities of various objects with respect to frame A. Upon determining the optical flow between frame A and frame B, view 1 may be generated based on blending these time-adjacent frames using the optical flow.

The real-time multiview video conversion may be embodied in a processor-based system such as, for example, a computing device. In this respect, embodiments are directed to a system configured to perform real-time multiview video conversion, the system comprising a central processing unit (CPU) and a memory that stores a plurality of instructions, which, when executed, cause the CPU to perform various operations that carry out the real-time multiview video conversion. An example of this system is described below with respect to FIG. 10.

The plurality of instructions, which, when executed, may cause the CPU to load into a memory buffer a series of two-dimensional (2D) frames, each 2D frame corresponding to a respective 2D video timestamp; determine a target timestamp for a view of a multiview frame based on a camera baseline and a center viewpoint; and generate the view from a subset of 2D frames having 2D video timestamps adjacent to the target timestamp. In addition, the view of the multiview frame is part of a multiview video configured to be rendered on a multiview display.

Figure 8:
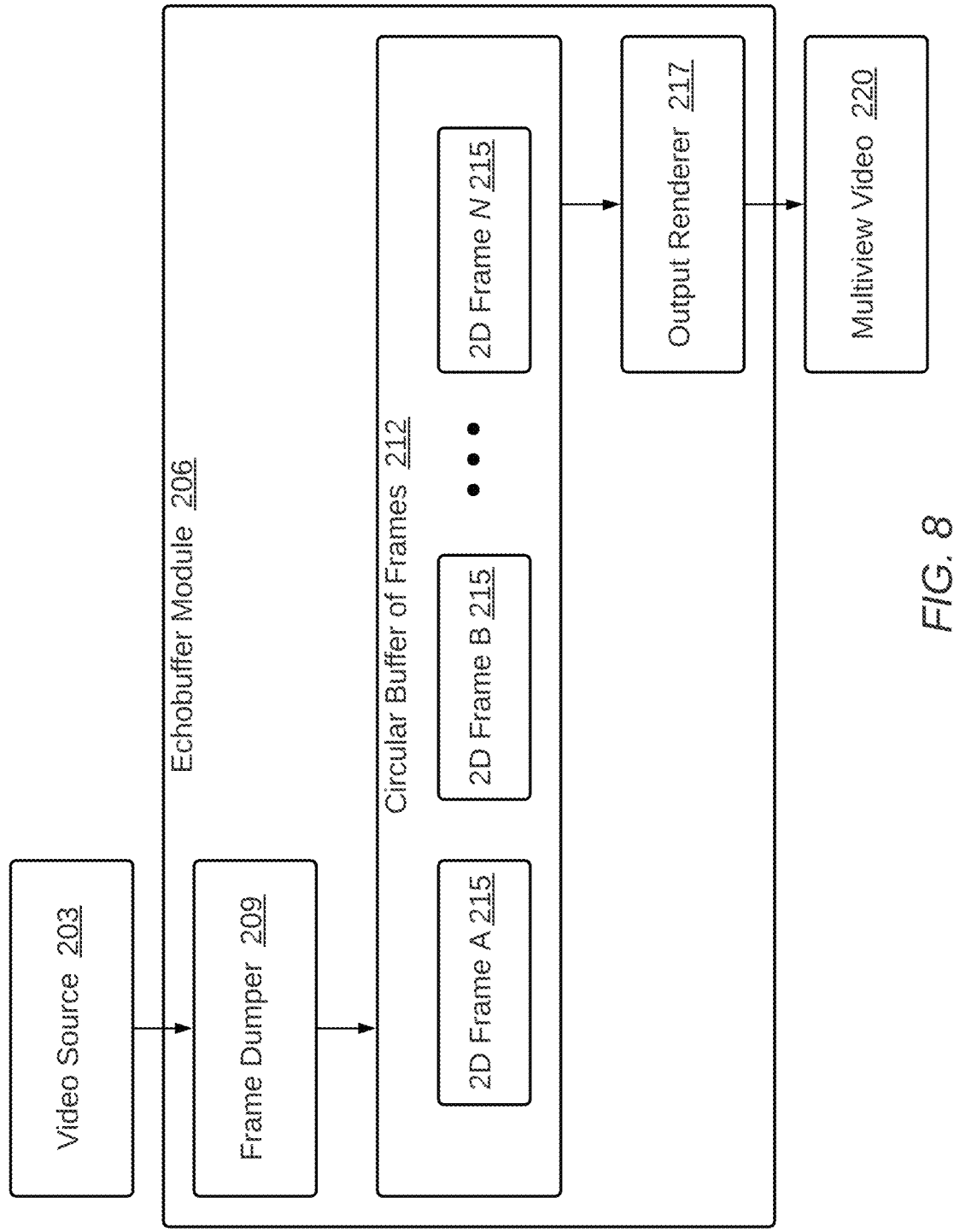
FIG. 8 illustrates an example of an architecture for converting a 2D video stream into multiview video in real time according to an embodiment consistent with the principles described herein.

FIG. 8 illustrates an example of an architecture for converting a 2D video stream into multiview video in real time according to an embodiment consistent with the principles described herein. FIG. 8 illustrates a processor-based system that executes instructions to perform-real time multiview video conversion. Specifically, FIG. 8 depicts a video source 203 that streams 2D video comprising a series of 2D frames, each 2D frame corresponding to a respective 2D video timestamp. The video source 203 may be similar to the video source 127 described above with respect to FIG. 2.

The processor-based system may include an echobuffer module 206 that is implemented by a set of instructions stored in a memory and executable by a processor (e.g., CPU). The echobuffer module 206 may implement various application programming interfaces (APIs), function calls, or commands to receive a 2D video stream, convert 2D frames into multiview frames, and render a multiview video output in real time. The echobuffer module 206 may interface with various memory devices to load and retrieve video content (e.g., frames). The echobuffer module 206 may include a frame dumper 209. The frame dumper 209 is configured to load into a memory buffer a series of two-dimensional (2D) frames. The memory buffer may be a circular buffer of frames 212.

In some embodiments, the frame dumper 209 interfaces with a graphics pipeline having a graphics processing unit (GPU) configured to decode a video stream comprising the series of 2D frames. The GPU may be configured to load the 2D frames into a GPU memory as decoded 2D frames. The frame dumper 209 may then load the series of 2D frames from the GPU memory to the memory buffer (e.g., circular buffer of frames 212). Thus, the series of 2D frames are configured to be loaded from the GPU memory to the memory buffer. As shown in FIG. 8, the memory buffer stores 2D frames 215 including frame A through frame N.

The echobuffer module 206 may determine a target timestamp for a view of a multiview frame based on a camera baseline and a center viewpoint. This may be similar as the example of FIG. 4 which shows a camera baseline 145 and a center viewpoint 148 that is used to determine a target timestamp of a particular view. The echobuffer module 206 may include an output renderer 217 that is configured to generate the view from a subset of 2D frames having 2D video timestamps adjacent to the target timestamp. For example, the blending operations discussed above with respect to FIG. 7A or 7B may be used to generate views based on time-adjacent 2D frames. For example, the CPU may be configured to determine the time differences between the target timestamp and the 2D video timestamps adjacent to the target timestamp; and perform a weighted blend proportional to the time differences to generate the view, as discussed above with respect to FIG. 7A. The CPU may also be configured to perform a motion-based blend of time-adjacent 2D frames, as discussed above with respect to FIG. 7B.

The output renderer 217 may generate a multiview video 220 of multiview frames. Each multiview frame is made up of a set of different views. The views may be generated by blending together sampled time-adjacent 2D frames. The multiview video 220 may be formatted in a suitable video file format and stored in memory. The multiview video 220 may be configured to be rendered on a multiview display. An example of rendering multiview video for display is discussed above with respect to FIG. 5. The multiview video may be configured to be rendered on the multiview display while the decoding the video stream as discussed above with respect to FIG. 6.

The echobuffer module 206 may be part of or otherwise work in conjunction with an application that is executed by the CPU to provide a user interface. The user interface may be similar to the user interface discussed above with respect to FIG. 4. The application may be implemented as a plurality of instructions that are executable by the CPU to cause the CPU to generate a user interface that is configured to be displayed on the multiview display. In addition, the CPU may receive user input via the user interface, the user input comprising at least one of the camera baseline and the center viewpoint. The CPU may dynamically update at least one of the camera baseline and the center viewpoint while the multiview video is rendered. The CPU may also switch between rendering the multiview video and rendering the 2D video stream in response to user input received via the user interface. For example, selecting a 2D video format may bypass the echobuffer module 206 to route the received 2D video directly to a graphics pipeline for rendering without real-time multiview video conversion.

Figure 9:
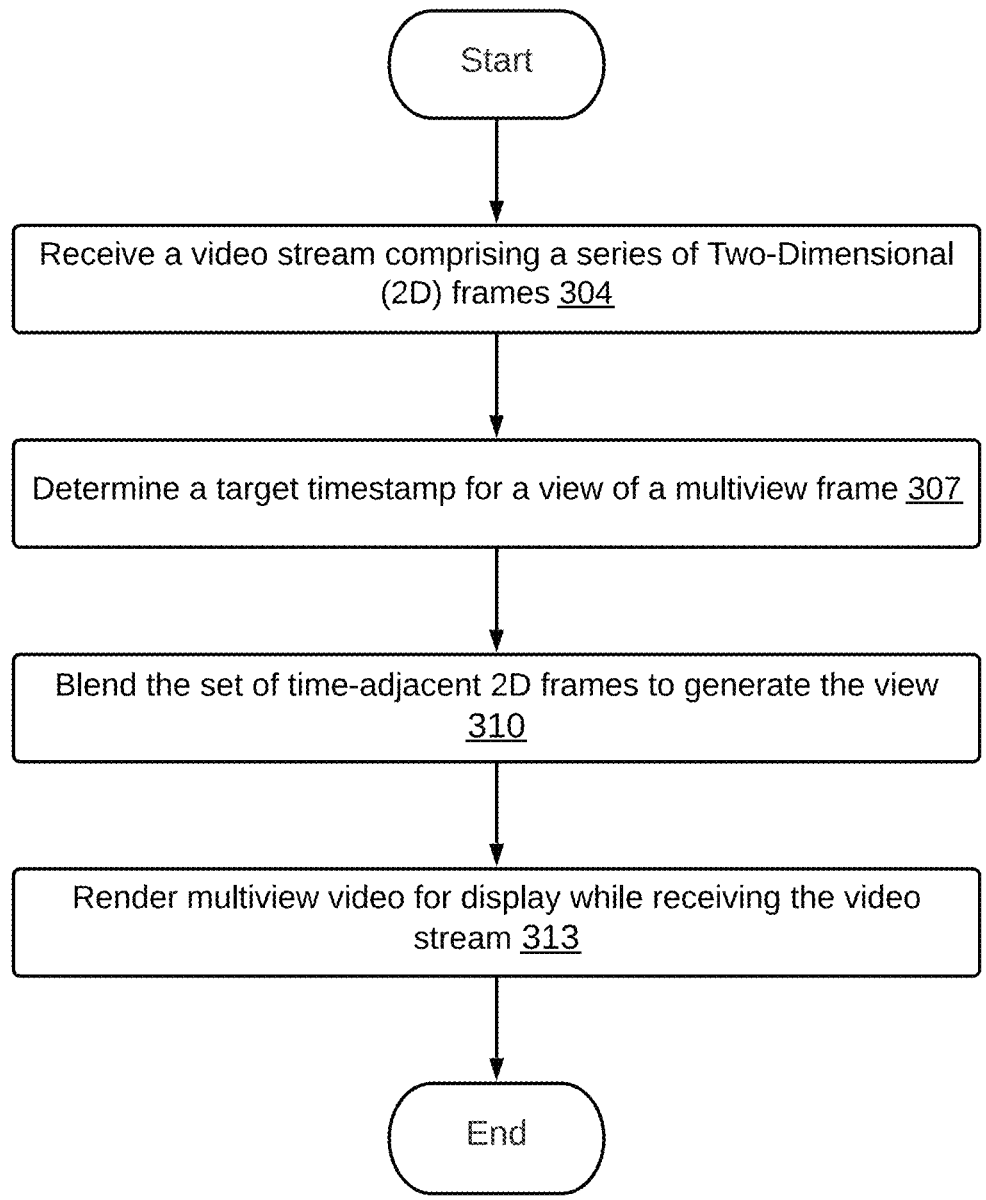
FIG. 9 illustrates a flowchart of a system and a method of performing real-time multiview video conversion according to an embodiment consistent with the principles described herein.

FIG. 9 illustrates a flowchart of a system and a method of performing real-time multiview video conversion according to an embodiment consistent with the principles described herein. The flowchart of FIG. 9 provides one example of the different types of functionality implemented by a computing device executing an instruction set. The flowchart of FIG. 9 may also be viewed as depicting an example of elements of a computer-implemented method according to one or more embodiments. The flowchart of FIG. 9 may also be viewed as depicting operations of a non-transitory, computer-readable storage medium storing executable instructions that, when executed by a processor of a computer system, performs operations of multiview video conversion in real time.

At item 304, the operations include receiving a video stream comprising a series of two-dimensional (2D) frames, each 2D frame corresponding to a respective 2D video timestamp. The 2D frames may be similar to the 2D frames 115 discussed with respect to FIG. 3.

At item 307, the operations include determining a target timestamp for a view of a multiview frame. As discussed above with respect to FIG. 3, the target timestamp may be adjacent to a set of 2D video timestamps that correspond to a set of 2D frames. In some embodiments, the operations include determining the target timestamp based on at least one of a user-specified camera baseline or a user-specified center viewpoint. For example, a user interface may be used to obtain user input similar to the discussed above with respect to FIG. 4.

At item 310, the operations include blending the set of 2D frames to generate the view. For example, as discussed above with respect to FIG. 7A, the blending may involve determining the time differences between the target timestamp and the 2D video timestamps adjacent to the target timestamp; and performing a weighted blend proportional to the time differences to generate the view. The blending may also be motion-based blending as discussed above with respect to FIG. 7B.

At item 313, the operations include rendering a multiview video for display while receiving the video stream, the multiview video comprising the view of the multiview frame. For example, FIG. 5 depicts a multiview display that renders multiview video, which may be done in real time as 2D video is received and converted into a multiview format. While multiview video is converted and rendered in real time, the operations may involve switching from rendering the multiview video to rendering the 2D video stream in response to user input received via a user interface.

The flowchart of FIG. 9 discussed above may illustrate a system or method of real-time multiview video conversion embodied as an instruction set that is stored in memory and executable by a processor. If embodied in software, each box may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor a computing device. The machine code may be converted from the source code, etc. If embodied in hardware, each block may represent a circuit or a number of interconnected circuits to implement the specified logical function(s).

Although the flowchart of FIG. 9 shows a specific order of execution, it is to be understood that the order of execution may differ from that which is depicted. For example, the order of execution of two or more boxes may be scrambled relative to the order shown. Also, two or more boxes shown may be executed concurrently or with partial concurrence. Further, in some embodiments, one or more of the boxes may be skipped or omitted or may be performed contemporaneously.

FIG. 10 is a schematic block diagram that depicts an example of a computing device that performs real-time multiview video conversion according to an embodiment consistent with the principles described herein. The computing device 1000 may include a system of components that carry out various computing operations for a user of the computing device 1000. The computing device 1000 may be a laptop, tablet, smart phone, touch screen system, intelligent display system, other client device, server, or other computing device. The computing device 1000 may include various components such as, for example, a processor(s) 1003, a memory 1006, input/output (I/O) component(s) 1009, a display 1012, and potentially other components. These components may couple to a bus 1015 that serves as a local interface to allow the components of the computing device 1000 to communicate with each other. While the components of the computing device 1000 are shown to be contained within the computing device 1000, it should be appreciated that at least some of the components may couple to the computing device 1000 through an external connection. For example, components may externally plug into or otherwise connect with the computing device 1000 via external ports, sockets, plugs, connectors, or wireless links.

A processor 1003 may include a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data or generate data. For example, the processor(s) 1003 may receive input data (e.g., an image), process the input data according to an instruction set, and generate output data (e.g., a processed image). As another example, the processor(s) 1003 may receive instructions and generate new instructions for subsequent execution. The processor 1003 may comprise the hardware to implement a graphics pipeline (e.g., the graphics pipeline 134 of FIG. 2) to render video, images, or frames generated by applications. For example, the processor(s) 1003 may comprise one or more GPU cores, vector processors, scaler processes, decoders, or hardware accelerators.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003. Images (e.g., still images, video frames) may be stored or loaded in memory 1006 for subsequent access.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the computing device 1000, it should be appreciated that the memory 1006 may be embedded or otherwise integrated, at least partially, into one or more components. For example, the processor(s) 1003 may include onboard memory registers or cache to perform processing operations.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s)

1003 and convert them into a format that is perceived by the user (e.g., sound, tactile responses, visual information, etc.).

One type of I/O component 1009 is a display 1012. The display 1012 may include a multiview display (e.g., multiview display 160), a multiview display combined with a 2D display, or any other display that presents graphic content. A capacitive touch screen layer serving as an I/O component 1009 may be layered within the display to allow a user to provide input while contemporaneously perceiving visual output. The processor(s) 1003 may generate data that is formatted as an image or frame for presentation on the display 1012. The processor(s) 1003 may execute instructions to render the image or frame on the display 1012 for the user. A camera I/O component 1009, may be used for a video capture process that captures video that may be converted into multiview video.

The bus 1015 facilitates communication of instructions and data between the processor(s) 1003, the memory 1006, the I/O component(s) 1009, the display 1012, and any other components of the computing device 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the computing device 1000, such as scheduling tasks, controlling I/O components 1009, providing access to hardware resources, managing power, and supporting applications 1034.

An application(s) 1034 executes on the operating system 1031 and may gain access to hardware resources of the computing device 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the computing device 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java®, Swift, JavaScript®, Perl, PHP, Visual Basic®, Python®, Ruby, Go, or other programming languages. The application(s) 1034 may be compiled by a compiler into object code or interpreted by an interpreter for execution by the processor(s) 1003. Various embodiments discussed herein may be implemented as at least part of the application 1034.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image.

Firmware, such as, for example, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the computing device 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the computing device 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The computer-readable storage medium may or may not be part of the computing device 1000. The instructions may include, for example, statements, code, or declarations that can be fetched from the computer-readable medium and executed by processing circuitry (e.g., the processor(s) 1003). In the context of the present disclosure, a 'computer-readable medium' may be any medium that can contain, store, or maintain the instructions described herein for use by or in connection with an instruction execution system, such as, for example, the computing device 1000.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The computing device 1000 may perform any of the operations or implement the functionality described above. For example, the flowchart and process flows discussed above may be performed by the computing device 1000 that executes instructions and processes data. While the computing device 1000 is shown as a single device, embodiments are not so limited. In some embodiments, the computing device 1000 may offload processing of instructions in a distributed manner such that a plurality of computing devices 1000 operate together to execute instructions that may be stored or loaded in a distributed arrangement of computing components. For example, at least some instructions or data may be stored, loaded, or executed in a cloud-based system that operates in conjunction with the computing device 1000.

Thus, there have been described examples and embodiments of real-time multiview video conversion. This may be in real time as a 2D video stream is received. Views of each multiview frame are generated by determining a target timestamp, identifying time-adjacent 2D video frames based on the target timestamp, and blending the time-adjacent 2D video frames to generate each view. The target timestamp may be determined based on one or both of a camera baseline and a center viewpoint. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A computer-implemented method of real-time multiview video conversion, the method comprising:
   receiving a video stream comprising two-dimensional (2D) frames by a computing device, each 2D frame corresponding to a respective 2D video timestamp;
   identifying a camera baseline and a center viewpoint by the computing device, wherein the camera baseline defines an interval between views of a multiview frame, and the center viewpoint is a midpoint in a range of views of the multiview frame;
   determining a respective target timestamp for each view of the multiview frame based on the camera baseline and the center viewpoint by the computing device;
   using the determined target timestamps, generating views of the multiview frame from respective subsets of 2D frames having 2D video timestamps adjacent to the target timestamp for each respective view by the computing device; and
   rendering a multiview video for display by the computing device, the multiview video comprising the multiview frame.

2. The method of claim 1, further comprising decoding the video stream to extract the 2D frames in a graphics processing unit memory of the computing device.

3. The method of claim 2, further comprising loading the 2D frames from the graphics processing unit memory to a central processing unit memory of the computing device to generate the view.

4. The method of claim 1, further comprising rendering the multiview video for display while receiving the video stream by the computing device.

5. The method of claim 1, further comprising receiving user input by the computing device via a user interface, the user input comprising at least one of the camera baseline and the center viewpoint.

6. The method of claim 5, further comprising dynamically updating at least one of the camera baseline and the center viewpoint while rendering the multiview video by the computing device.

7. The method of claim 1, wherein the view is generated by blending the subset of 2D frames.

8. The method of claim 1,
   wherein generating the views of the multiview frame includes, for a first view:
   determining time differences between the target timestamp of the first view and the 2D video timestamps adjacent to the target timestamp of the first view by the computing device; and
   performing a weighted blend proportional to the time differences to generate the first view by the computing device.

9. A system configured to perform real-time multiview video conversion, the system comprising:
   a central processing unit; and
   a memory that stores a plurality of instructions, which, when executed, cause the central processing unit to:
   load into a memory buffer a series of two-dimensional (2D) frames, each 2D frame corresponding to a respective 2D video timestamp;
   determine a respective target timestamp for each view of a multiview frame based on a camera baseline and a center viewpoint, wherein the camera baseline defines an interval between views of the multiview frame, and the center viewpoint is a midpoint in a range of views of the multiview frame; and
   using the determined target timestamps, generate views of the multiview frame from respective subsets of 2D frames having 2D video timestamps adjacent to the target timestamp for each respective view,
   wherein the views of the multiview frame comprise part of a multiview video configured to be rendered on a multiview display.

10. The system of claim 9, further comprising:
    a graphics processing unit configured to decode a video stream comprising the series of 2D frames and load the 2D frames into a graphics processing unit memory, wherein the series of 2D frames are configured to be loaded from the graphics processing unit memory to the memory buffer.

11. The system of claim 10, wherein the multiview video is configured to be rendered on the multiview display while decoding the video stream.

12. The system of claim 9, wherein the instructions further cause the central processing unit to:
    generate a user interface that is configured to be displayed on the multiview display; and
    receive user input via the user interface, the user input comprising at least one of the camera baseline and the center viewpoint.

13. The system of claim 12, wherein the instructions further cause the central processing unit to:
    dynamically update at least one of the camera baseline and the center viewpoint while the multiview video is rendered.

14. The system of claim 9, wherein the instructions further cause the central processing unit to:
    generate a user interface that is configured to be displayed on the multiview display; and
    switch between rendering the multiview video and rendering a 2D video stream in response to user input received via the user interface.

15. The system of claim 9, wherein the views are generated by blending the subset of 2D frames.

16. The system of claim 9, wherein the instructions further cause the central processing unit to, for a first view of the multiview frame:
   determine time differences between the target timestamp of the first view and the 2D video timestamps adjacent to the target timestamp of the first view; and
   perform a weighted blend proportional to the time differences to generate the first view.

17. A non-transitory, computer-readable storage medium storing executable instructions that, when executed by a processor of a computer system, performs operations of multiview video conversion in real time, the operations comprising:
   receiving a video stream comprising a series of two-dimensional (2D) frames, each 2D frame corresponding to a respective 2D video timestamp;
   determining a respective target timestamp for each view of a multiview frame, the target timestamps being adjacent to respective sets of 2D video timestamps that correspond to a set of 2D frames for each respective view;
   blending each set of 2D frames to generate a corresponding respective view of the multiview frame; and
   rendering a multiview video for display while receiving the video stream, the multiview video comprising the multiview frame.

18. The non-transitory, computer-readable storage medium of claim 17, wherein the operations further comprise:
   determining the target timestamp based on at least one of a user-specified camera baseline and a user-specified center viewpoint.

19. The non-transitory, computer-readable storage medium of claim 17, wherein the operations further comprise:
   determining time differences between a particular target timestamp and the 2D video timestamps adjacent to the particular target timestamp; and
   performing a weighted blend proportional to the time differences to generate the view of the multiview frame corresponding to the particular target timestamp.

20. The non-transitory, computer-readable storage medium of claim 17, wherein the operations further comprise:
   switching between rendering the multiview video and rendering a 2D video stream in response to user input received via a user interface.

* * * * *